United States Patent
Roach (10) Patent No.: US 12,045,208 B2
(45) Date of Patent: Jul. 23, 2024

(54) AUTOMATIC BUFFER POOL PAGE FIX PRIORITIZATION FOR DATABASE TUNING

(71) Applicant: BMC Software, Inc., Houston, TX (US)

(72) Inventor: Donnell W. Roach, Houston, TX (US)

(73) Assignee: BMC Software, Inc., Houston, TX (US)

( * ) Notice: Subject to any disclaimer, the term of this patent is extended or adjusted under 35 U.S.C. 154(b) by 67 days.

(21) Appl. No.: 17/657,347

(22) Filed: Mar. 30, 2022

(65) Prior Publication Data

US 2023/0315697 A1    Oct. 5, 2023

(51) Int. Cl.
*G06F 16/21* (2019.01)
*G06F 11/34* (2006.01)
*G06F 16/2455* (2019.01)
*G06F 16/2457* (2019.01)

(52) U.S. Cl.
CPC .......... *G06F 16/21* (2019.01); *G06F 11/3485* (2013.01); *G06F 11/349* (2013.01); *G06F 16/24552* (2019.01); *G06F 16/24578* (2019.01)

(58) Field of Classification Search
CPC .............. G06F 16/21; G06F 16/24552; G06F 16/24578; G06F 11/3485; G06F 11/349
See application file for complete search history.

(56) References Cited

U.S. PATENT DOCUMENTS

| | | | |
|---|---|---|---|
| 2006/0101224 A1* | 5/2006 | Shah ................. | G06F 9/5077 711/173 |
| 2010/0153974 A1* | 6/2010 | Cardona .............. | G06F 9/544 719/321 |
| 2016/0188247 A1* | 6/2016 | Garcia-Arellano ..... | G06F 12/02 711/173 |

OTHER PUBLICATIONS

Jeff Berger, IBM DB2 11 for z/OS Buffer Pool Monitoring and Tuning, Jul. 2014, Internation Technical Support Organization, First Edition (Year: 2014).*
IBM OMEGAMON for Db2 Performance Expert on z/OS, Buffer Pool Analyzer User's Guide, 2021, IBM, Mar. 23, 2021 edition (Year: 2021).*

* cited by examiner

*Primary Examiner* — Sherief Badawi
*Assistant Examiner* — Earl Levi Elias
(74) *Attorney, Agent, or Firm* — Brake Hughes Bellermann LLP (57) ABSTRACT

For each database subsystem in a plurality of database subsystems running in a logical partition (LPAR), the systems and techniques include collecting data from buffer pools on a periodic interval, monitoring real storage availability on the LPAR, calculating an input/output (I/O) intensity score for each buffer pool for the periodic interval, ranking the buffer pools based on the I/O intensity score, calculating a cumulative I/O intensity score for each buffer pool across a cycle of multiple periodic intervals, ranking the buffer pools based on the cumulative I/O intensity score, and selecting a buffer pool candidate for page fixing. The buffer pool candidate for page fixing is a highest-ranked buffer pool from the plurality of buffer pools during the cycle based on the cumulative I/O intensity score that satisfies the real storage availability on the LPAR.

18 Claims, 7 Drawing Sheets

| Parameter | User-configurable limit | Default limit | Type |
|---|---|---|---|
| Maximum buffer pool real in-use | Yes | Yes | Ceiling |
| LPAR real available | Yes | Yes | Floor |
| Percentage of LPAR real in-use by buffer pools | Yes | Yes | Ceiling |
| Percentage of LPAR 1M large frames in-Use | Yes | No | Ceiling |
| Percentage of LPAR 2G large frames in-Use | Yes | No | Ceiling |
| LPAR page steal threshold | No | Yes | Floor |
| Db2 subsystem real storage limit (ZPARM) | No | Yes | Ceiling |

```
SDSF OUTPUT DISPLAY QA$IGDBC STC68613  DSID  103  LINE 14. 800   COLUMNS 40 - 119
COMMAND INPUT  ===>                                              SCROLL ===> CSR
DML2   REQUESTED BY: ADVISOR
DML2   === SIZE ATTRIBUTE ===============   BPO PAGE FIX ANALYSIS          ← 702
DML2   VPSIZE = 2000
DML2   === INTERVAL I/O =================
DML2   I/O INTENSITY SCORE       =   2880 RANKED = 1                       ← 706
DML2   === CUMALATIVE TRENDS ============                                  ← 704
DML2   TOP  =  288 TOP 5  =  0 TOP 10 = 0
DML2   CYCLE MEASURED     =   303
DML2   === RECOMMENDED RESOURCES ====                                      ← 708
DML2   RECOMMENDED FRMSZ = 1M                                              ← 710
DML2   RECOMMENDED 1M FRAMES = 8                                           ← 712
DML2   RESOURCES AVAILABLE FOR PAGEFIX = (Y)                               ← 714
DML2
DML2                       BEFORE & AFTER ASSESSMENT
DML2            BPs REAL    MAX Db2    LPAR REAL    % OF LPAR   LPAR      LPAR
DML2             IN USE     REAL USE   AVAILABLE     Db2 USE    1M USE    2G USE
DML2           ---------   ---------  -----------  ---------   -------   -------
DML2  BEFORE:    22090       111773     8061326      0.55 %      437        0
DML2  AFTER:     24090       113773     8059326      0.56 %      445        0
DML2                       THRESHOLD ASSESSMENT
DML2            MAX BPs    MAX Db2     MIN LPAR     MAX LPAR   MAX 1M    MAX 2G
DML2           REAL USE    REAL USE    AVAILABLE    Db2 USE%   USE%      USE%
DML2           ---------   ---------  -----------  ---------   -------   -------
DML2  MAX/MIN:  12632064   15771267    74320       NP %        NP %      NP %
DML2  NEW LEVEL: (NORMAL)  (NORMAL)    (NORMAL)     NP         NP        NP
DML2
DML2  ** TOP I/O INTENSIVE SSID/BP = DML2/BPO
DML2   ++++++++++++++++++++++++++++++++  END OF ANALYSIS  +++++++++++++++++++++++
DML2
R PMDZBPM1 DML2 1 (BR9) PFIX BPO 1M
```

700

AUTOMATIC BUFFER POOL PAGE FIX PRIORITIZATION FOR DATABASE TUNING

TECHNICAL FIELD

This description relates to automatic buffer pool page-fix prioritization for database tuning.

BACKGROUND

A database management system may run on a computing system such as, for example, a mainframe computing system. One example of a database management system is a relational database management system, where all of the data is logically contained in tables. The databases may be organized according to the relational model. Software is used to manage the relational databases. Other software or software components may be used to monitor, enhance, and optimize the performance of the relational database management system and the relational databases.

In one example, Db2® for z/OS® is a relational database management system that runs on a mainframe computing system. Db2 for z/OS may function and operate as an enterprise data server for the mainframe computing system, where Db2 is software that is used to manage relational databases and z/OS is an operating system for use on the mainframe computing system. BMC AMI Pool Advisor for Db2 includes software and related components that monitor, enhance, and optimize various aspects of Db2.

Many database systems use buffer pools to temporarily store pages of data, tables, and/or indexes. Access to the information in this temporary storage is faster than accessing the information from permanent storage, such as from on a disk. For example, when an application program accesses a row of a table, the database management system retrieves the page that contains the row and places the page in a buffer pool. If the required data is already in a buffer pool, the application program does not need to wait for it to be retrieved from disk, so the time and cost of retrieving the page is reduced.

Mainframe computing systems, database systems, and database management systems, including the buffer pools, may need to be tuned to optimize performance for different workloads. Database administrators (DBAs) and system programmers currently may perform many tuning tasks manually to most effectively use the mainframe computing system and the database system resources. It is desirable to have technical solutions that dynamically and automatically tune these systems to handle various workloads, especially as workloads change.

SUMMARY

In some aspects, the techniques described herein relate to a computer-implemented method for identifying a buffer pool for page fixing, the method including: for each database subsystem in a plurality of database subsystems running in a logical partition (LPAR): collecting data from a plurality of buffer pools on a periodic interval; monitoring real storage availability on the LPAR; calculating an input/output (I/O) intensity score for each buffer pool from the plurality of buffer pools for the periodic interval; ranking the plurality of buffer pools based on the I/O intensity score; calculating a cumulative I/O intensity score for each buffer pool from the plurality of buffer pools across a cycle of multiple periodic intervals; ranking the plurality of buffer pools based on the cumulative I/O intensity score; and selecting a buffer pool candidate for page fixing, where the buffer pool candidate for page fixing is a highest-ranked buffer pool from the plurality of buffer pools during the cycle based on the cumulative I/O intensity score that satisfies the real storage availability on the LPAR.

According to other general aspects, a computer program product may execute instructions and cause a computing device to perform the computer-implemented method. According to other general aspects, a system, such as a computing system, a mainframe system, or a distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 7 is an example screen shot of an output identifying a buffer pool candidate for page fixing.

DETAILED DESCRIPTION

The systems and techniques described herein provide improved, automated tuning of a mainframe computing system, a database management system, and databases operating on those systems. The systems and techniques described herein provide technical solutions to improve the performance and efficient use of resources of the systems and databases in an automated manner.

Specifically, the systems and techniques described herein provide technical solutions for automated real storage capacity monitoring at multiple different levels. The systems and techniques described herein provide automated buffer pool performance monitoring including the tracking of key performance indicators (KPIs) used to identify the best page-fix candidates. The systems and techniques described herein provide automated buffer pool tuning using a top-down approach to page-fix buffer pools in an automated manner. The technical solutions described herein remove the manual efforts required by database administrators (DBAs) and systems programmers to monitor real storage capacity and buffer pool performance and to implement buffer pool tuning. The technical solutions described herein eliminate the manual efforts required by DBAs and system programmers to determine if page fixing buffer pools is a possibility and how to effectively use the real storage resources to implement a fix. The technical solutions described herein reduce the amount of input/output (I/O) processing within the LPAR.

As used herein, a buffer pool is a location in the Db2 address space where Db2 performs all of its data transfer such as reading and/or writing records in response to receiving commands, such as structured query language (SQL) statements. Data communicated to and from the data base may be transferred to and from the buffer pool and held in the buffer pool for transfer. A buffer pool may be sized to read and write a specific page size. For instance, a buffer pool may be sized in different kilobyte (KB) sizes such as, for example, 4 KB, 8 KB, 16 KB, of 32 KB, to read different page sizes. Additionally, each buffer pool may be a different size. Each buffer pool may be designated as either pageable or page-fixed.

As used herein, real storage refers to physical memory for storing data from the database. The real storage may include an amount of physical memory on a LPAR.

As used herein, virtual storage refers to virtual memory for storing data from the database.

As used herein, page fix or page fixing refers to a process of moving data from a buffer pool to real storage to avoid the data from paging in and out of disk-based storage.

As used herein, I/O intensity score refers to a heuristic measure of the intensity of a buffer pool that provides a value as a constant across all buffer pools.

Figure 1:
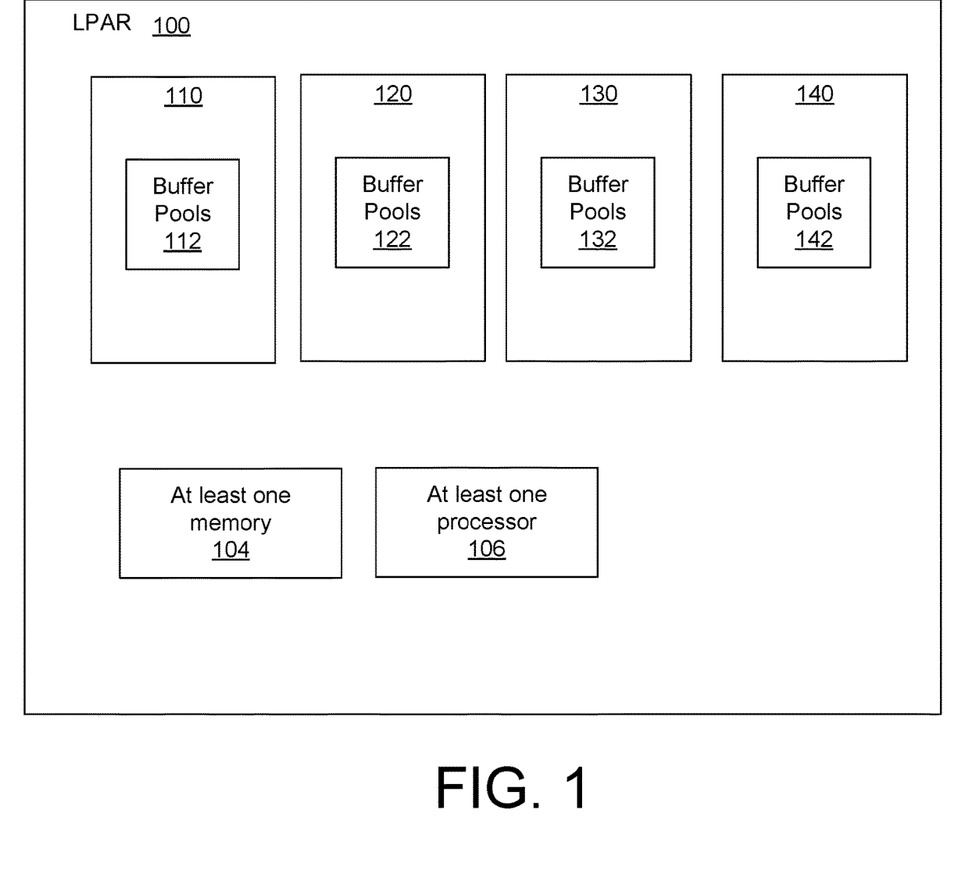
FIG. 1 is an example block diagram of a logical partition (LPAR).

FIG. 1 illustrates an example block diagram of a logical partition (LPAR) 100. The LPAR 100 is a logical segmentation of a mainframe computer's memory and other resources that allows the LPAR 100 to run its own copy of an operating system and associated applications. The LPAR 100 is, in practice, equivalent to a separate mainframe computing system.

The LPAR 100 includes at least one memory 104 and at least one processor 106. The at least one processor 106 may represent two or more processors on the LPAR 100 executing in parallel and utilizing corresponding instructions stored using the at least one memory 104. The at least one processor 106 may include at least one graphics processing unit (GPU) and/or central processing unit (CPU). The at least one memory 104 represents a non-transitory computer-readable storage medium. Of course, similarly, the at least one memory 104 may represent one or more different types of memory utilized by the LPAR 100. In addition to storing instructions, which allow the at least one processor 106 to implement various applications, the at least one memory 104 may be used to store data, such as data collected by applications and components within the LPAR 100.

The LPAR 100 includes database subsystems 110, 120, 130, and 140. It is understood that while this example illustrates four database subsystems 110, 120, 130, and 140, the LPAR 100 may include many more database subsystems. The database subsystems 110, 120, 130, and 140 may share the LPAR 100 resources such as the at least one memory 104 and the at least one processor 106. In some implementations, the database subsystems 110, 120, 130, and 140 may share the LPAR 100 resources and/or each have their own resources. Each of the database subsystems 110, 120, 130, and 140 may include multiple buffer pools 112, 122, 132, and 142. In some implementations, each of the database subsystems 110, 120, 130, and 140 may include up to eighty buffer pools 112, 122, 132, and 142.

Figure 2:
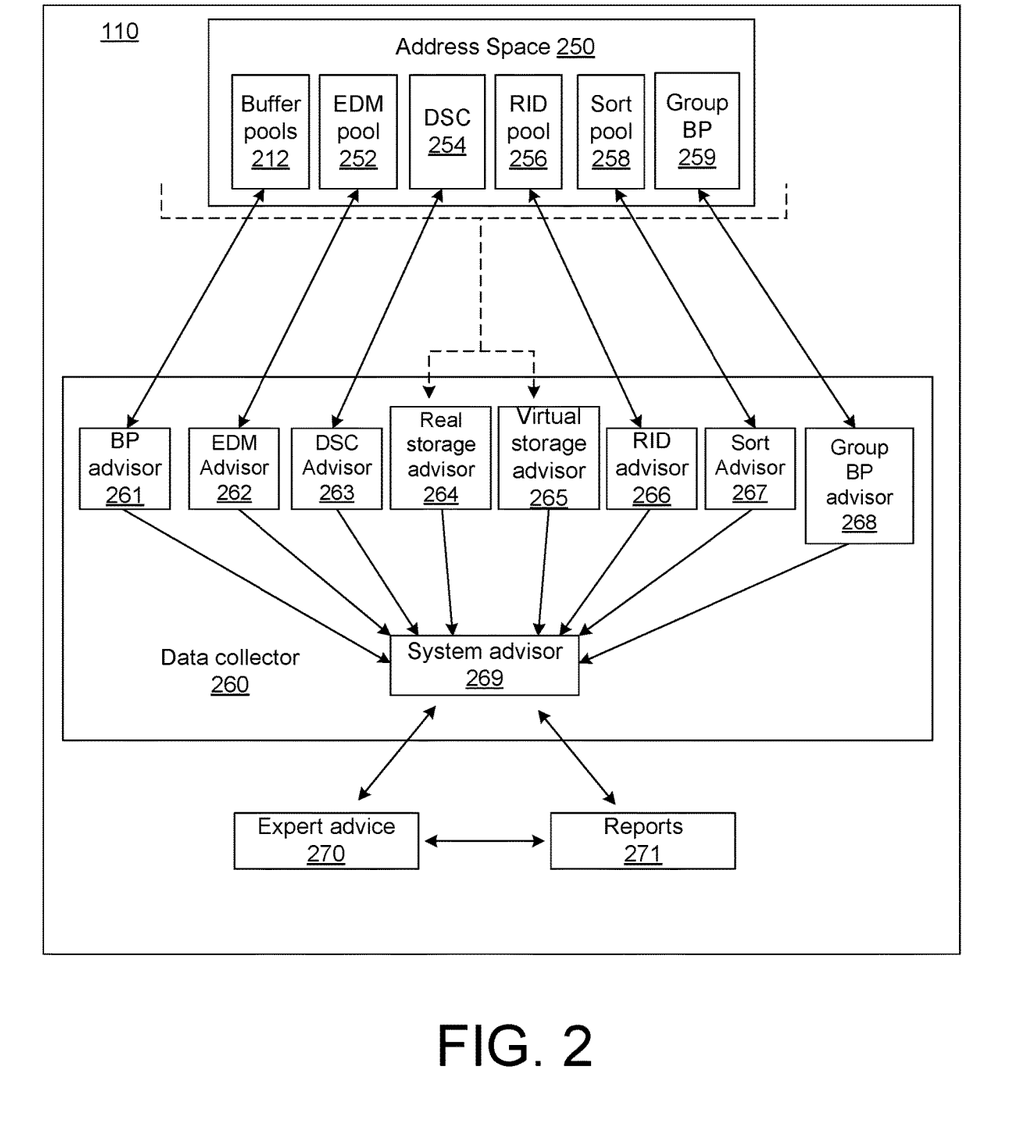
FIG. 2 is an example block diagram of a database subsystem.

FIG. 2 illustrates an example block diagram of the database subsystem 110 of FIG. 1 in more detail. The database subsystem 110 includes an address space 250 and a data collector 260.

In the context of a Db2 database subsystem, the address space 250 may be referred to as a Db2 DBM1 address space. The address space 250 is responsible for accessing the relational database and provide database-related services. The input and output to database resources is performed on behalf of SQL application programs in the address space 250.

In some implementations, the address space 250 may include the buffer pools 212, environmental descriptor manager (EDM) pool 252, dynamic statement cache (DSC) 254, record identifier (RID) pool 256, sort pool 258, and group buffer pool (BP) 259. The buffer pools 212 are the same as the buffer pools 112 of FIG. 1.

In other implementations, the EDM pool 252 may contain application plans and packages, database descriptors, and cached dynamic SQL statements. The DSC 254 is a pool in which Db2 saves control structures for prepared SQL statements that can be shared among different threads, plans, and packages. The RID pool 256 is an area of local storage that is reserved for RID sort processing, including RID list sort processing. The sort pool 258 is not part of the buffer pool. The sort pool 258 is allocated separately for each concurrently active thread that requests sort processing. The group BP 259 is a buffer pool that serves all members of a data-sharing group.

The data collector 260 is an address space in the database subsystem 110 that may include a BP advisor 261, an EDM advisor 262, a DSC advisor 263, a real storage advisor 264, a virtual storage advisor 265, a RID advisor 266, a sort advisor 267, and a group BP advisor 268. The BP advisor 261, the EDM advisor 262, the DSC advisor 263, the real storage advisor 264, the virtual storage advisor 265, the RID advisor 266, the sort advisor 267, and the group BP advisor 268 are all communicatively coupled to a system advisor 269. The system advisor 269 coordinates inputs from all of the other advisors 261-268 and outputs expert advice 270 and reports 271.

The BP advisor 261, the EDM advisor 262, the DSC advisor 263, the RID advisor 266, the sort advisor 267, and the group BP advisor 268 are all communicatively coupled to their respective pools in the address space 250. The real storage advisor 264 and the virtual storage advisor 265 are connected to the LPAR system as a whole and the storage available on each database subsystem within the LPAR.

The BP advisor 261 performs analysis and provides output advice for performance improvement to the buffer pools. For instance, the output advice may include a recommendation to increase a size of a particular buffer pool. In other examples, the output advice may include a recommendation to decrease the size of the particular buffer pool from the buffer pools 212.

The real storage advisor 264 monitors and analyses the real storage available on the LPAR as a whole and the real storage available on each database subsystem within the LPAR. In a similar manner, the virtual storage advisor 265 monitors and analyses the virtual storage available on the LPAR as a whole and the virtual storage available on each database subsystem within the LPAR.

The data collector 260 and its component advisors 261-269 are configured to determine the best database subsystem buffer pool candidates for page fixing. The data collector 260 and its component advisors 261-269 determine the top buffer pool candidates for page fixing on each database subsystem on which they are installed, as well as the best buffer pool candidates for page fixing across all database subsystems 110, 120, 130, and 140 on the LPAR 100.

Figure 3:
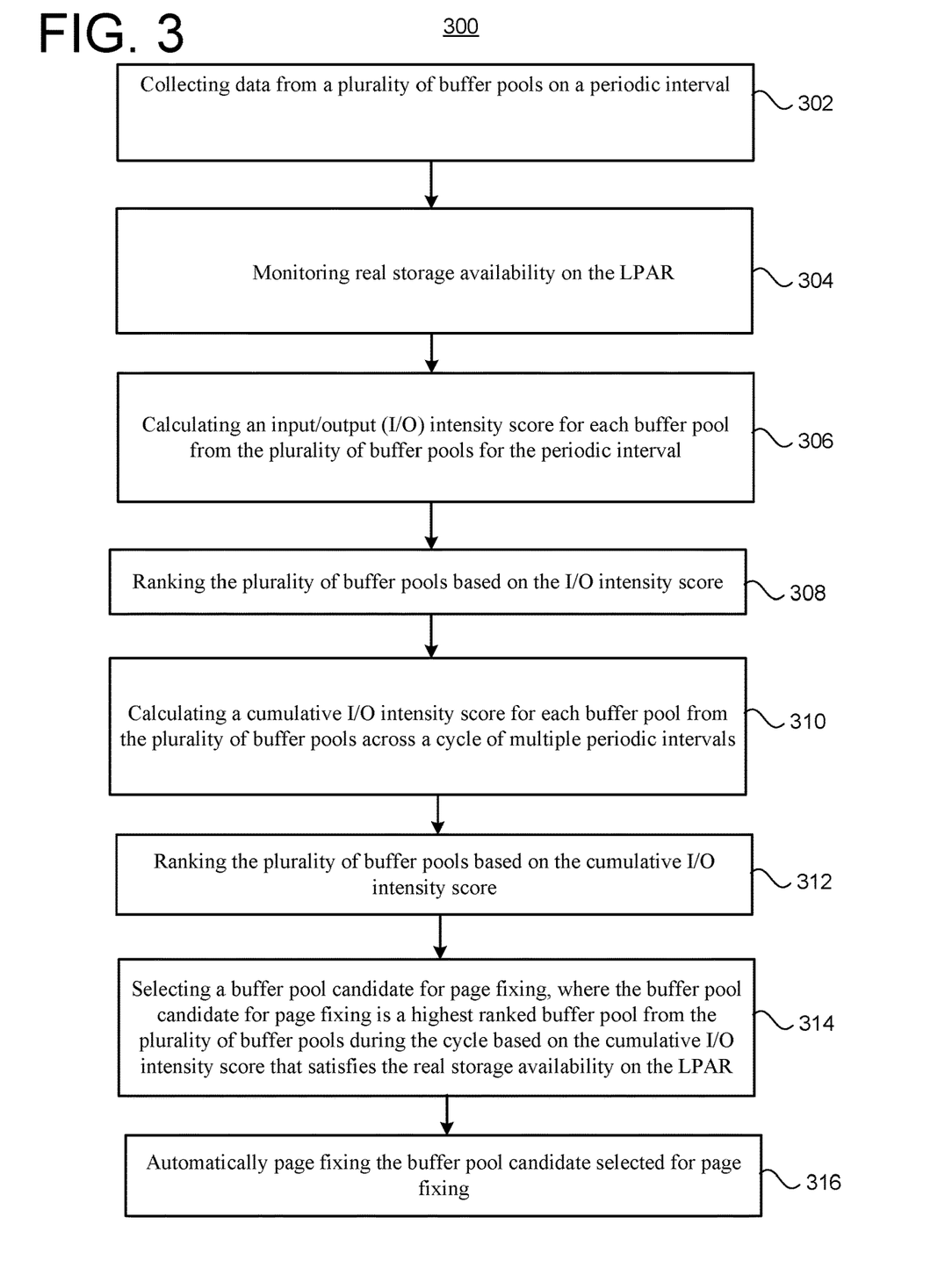
FIG. 3 is an example flow diagram of a process for identifying a buffer pool for page fixing using the database subsystem collector from FIG. 2.

FIG. 3 illustrates an example flow diagram of a process 300 for identifying a buffer pool for page fixing using the data collector 260 from FIG. 2. More specifically, process 300 illustrates an example computer-implemented method for identifying a buffer pool for page fixing. In some implementations, process 300 may be performed by the data collector 260 and one or more of its components 261-269. Instructions for the performance of process 300 may be stored in the at least one memory 104 of FIG. 1, and the stored instructions may be executed by the at least one processor 106 of FIG. 1. Process 300 is also illustrative of a computer program product that may executed by the at least one processor 106 and the data collector 260 and its components 261-269 using code stored in the at least one memory 104.

As noted above, the data collector 260 may determine candidate buffer pools for page fixing not only on one database subsystem (e.g., database subsystem 110), but across all the database subsystems 110, 120, 130, and 140 on the LPAR 100. Accordingly, while the process 300 may be performed by the data collector 260 on for example the database subsystem 110, the data collected and used during the process 300 by the data collector 260 may include sharing the collected data with other data collectors on the other database subsystems 120, 130, and 140, and receiving collected data with other data collectors on the other database subsystems 120, 130, and 140. In this manner, when it comes time to select a top buffer pool candidate or top buffer pool candidates for page fixing, the top buffer pool candidate or the top buffer pool candidates may be selected from among all the buffers 112, 122, 132, and 142 on the LPAR 100.

Process 300 includes collecting data from a plurality of buffer pools on a periodic interval (302). The data collector 260 is configured to collect data from the buffer pools 212 and store the data collected from the buffer pools 212. The data collected by the data collector 260 is used to calculate one or more key performance indicators KPIs that are used to identify buffer pool candidates for page fixing.

The data collected by the data collector 260 includes read input/output (I/O) data, such as the number of pages read, and write I/O data, such as the number of pages written to a buffer pool. The data is collected for each buffer pool. Size information for each buffer pool is also collected. That is, the size of the buffer pool and the page size that the buffer is configured to process is collected.

The data collector 260 collects the data in real-time or in substantially real-time on a periodic interval. In some implementations, data may be collected from each of the buffer pools 212 in five-minute increments. In some implementations, data may be collected from each of the buffer pools 212 in other time increments. Each data collection periodic interval may result in a bucket of data for each of the buffer pools 212. In some implementations, a cycle of multiple periodic intervals may include several buckets of data for each of the buffer pools 212, and the cycle of multiple periodic intervals may be measured in different time lengths. For example, in some implementations, the cycle of multiple periodic intervals may be twenty-four hours. In some implementations, the cycle of multiple periodic windows may be a cycle of fifteen minutes and include three buckets of data for each of the buffer pools 212. The length of the data collection periodic intervals and the cycle of multiple periodic windows may be configurable by a user.

Process 300 includes monitoring real storage availability on the LPAR (304). The data collector 260 collects data to determine the real storage available on the LPAR 100 and how much of the real storage the database subsystem 110 is currently using. The real storage advisor 264 may collect the data related to the real storage available on the LPAR 100 and how much of the real storage the database subsystem 110 is currently using. The real storage advisor 264 determines if there is real storage available to page-fix one or more of the identified buffer pools 212 by monitoring the amount of real storage available on the LPAR in real-time or substantially near real-time. The data collector 260 may make recommendations for page fixing based on sufficient real storage availability as monitored and determined by the real storage advisor 264.

Process 300 includes calculating an input/output (I/O) intensity score for each buffer pool from the plurality of buffer pools for the periodic interval (306). One of the KPIs that is used to identify buffer pool candidates for page fixing is the I/O intensity score. The I/O intensity score refers to a heuristic measure of the intensity of a buffer pool that provides a value as a constant across all the buffer pools 212.

The data collector 260 calculates I/O intensity score as a KPI for each of the buffer pools 212 in use by the database subsystem 110. The collected read I/O data and the collected write I/O data are summed (or counted) and divided by the size of the buffer pool. For example, the number of pages read is summed and added to the number of pages written and the total is then divided by the size of the buffer pool. The I/O intensity score is calculated every periodic interval in order to build a history over time. The automated process of data collection (or data mining) and performing the I/O intensity score calculations in real-time over numerous cycles saves the time and effort that would be required if this task were performed manually.

Process 300 includes ranking the plurality of buffer pools 212 based on the I/O intensity score (308). The data collector 260 ranks or assigns a ranking to each of the buffer pools 212 based on the I/O intensity score calculated for each of the buffer pools 212. In some implementations, the data collector 260 ranks each of the buffer pools 212 that registers an I/O intensity score greater than zero. In some implementations, the ranking of the buffer pools 212 may be a numbered ranking. The ranking of the buffer pools 212 may be stored and associated with the specific periodic interval.

Process 300 includes calculating a cumulative I/O intensity score for each buffer pool from the plurality of buffer pools across a cycle of multiple periodic intervals (310). The data collector 260 calculates a cumulative I/O intensity score for each of the buffer pools 212 across the cycle of multiple periodic intervals. The cumulative I/O intensity score for each of the buffer pools 212 is based on a number of times the buffer pool was ranked in multiple different top rankings based on the I/O intensity score. For example, in some implementations, the cumulative I/O intensity score may be based on a combination of how many times the buffer pool was ranked first during the cycle, how many times the buffer pool was ranked in the top five during the cycle, and how many times the buffer pool was ranked in the top ten during the cycle.

Process 300 includes ranking the plurality of buffer pools based on the cumulative I/O intensity score (312). The data collector 260 ranks the buffer pools 212 based on the cumulative I/O intensity score for each of the buffer pools 212.

Process 300 includes selecting a buffer pool candidate for page fixing, where the buffer pool candidate for page fixing is a highest-ranked buffer pool from the plurality of buffer pools during the cycle based on the cumulative I/O intensity score that satisfies the real storage availability on the LPAR (314). The data collector 260 selects the buffer pool with the highest cumulative I/O intensity score across all monitored database subsystems 110, 120, 130, and 140 on the LPAR 100 that satisfies the real storage availability on the LPAR 100.

Process 300 optionally includes automatically page fixing the buffer pool candidate selected for page fixing (316). Specifically, once a buffer pool candidate is selected for page fixing, then an action item may be added to an action item list. If a rule definition associated with the action item has been set to automatic mode, a command (e.g., ALTER BUFFERPOOL) is executed by the data collector 260 without any user intervention resulting in the data collector 260 automatically page fixing the buffer pool candidate selected for page fixing. If the rule definition associated with the action item has not been set to automatic mode and, instead, is in manual mode, then the user can select the action item for execution, which results in execution of the command (e.g., ALTER BUFFERPOOL).

In some implementations, the data collector 260 is configured to monitor an availability of frame sizes on the LPAR 100. The data collector 260 is configured to select an optimal frame size based on the availability of frame sizes on the LPAR 100. In this manner, the data collector 260 may automatically page-fix the buffer pool candidate selected for page fixing using the optimal frame size.

In some implementations, the data collector 260 determines if large frame sizes (e.g., 1 megabyte (1M), 2 gigabyte (2G), etc.) are available for usage and when the large frame sizes should be used. The use of large frame sizes can maximize the central processing unit's (CPU's) (e.g., the at least one processor 106 of FIG. 1) savings associated with page fixing buffer pools. The data collector monitors the 1M and 2G frame size availability on the LPAR 100 and determines when such resources would be best utilized. When large frame sizes are not available, the data collector 260 may select a default frame size. In some implementations, the default frame size may be 4 kilobytes (4K).

The command, ALTER BUFFERPOOL, may utilize PGFIX(YES) and FRAMESIZE( ) options when the command is executed, either in automatic mode or in manual mode.

The data collector 260 may receive user-configurable thresholds for LPAR parameters. When user-configurable thresholds are not received, the data collector 260 may use previously established default thresholds or may calculate default thresholds for the LPAR parameters. In some implementations, the data collector 260 may account for the LPAR parameters when selecting the highest-ranked buffer pool candidate for page fixing. In this manner, the data collector 260 selects the highest-ranked buffer pool candidate for page fixing when the LPAR parameters are satisfied by the highest-ranked buffer pool. If not, the data collector 260 considers the next highest-ranked buffer pool based on the cumulative I/O intensity score as a buffer pool candidate for page fixing.

Figure 4:
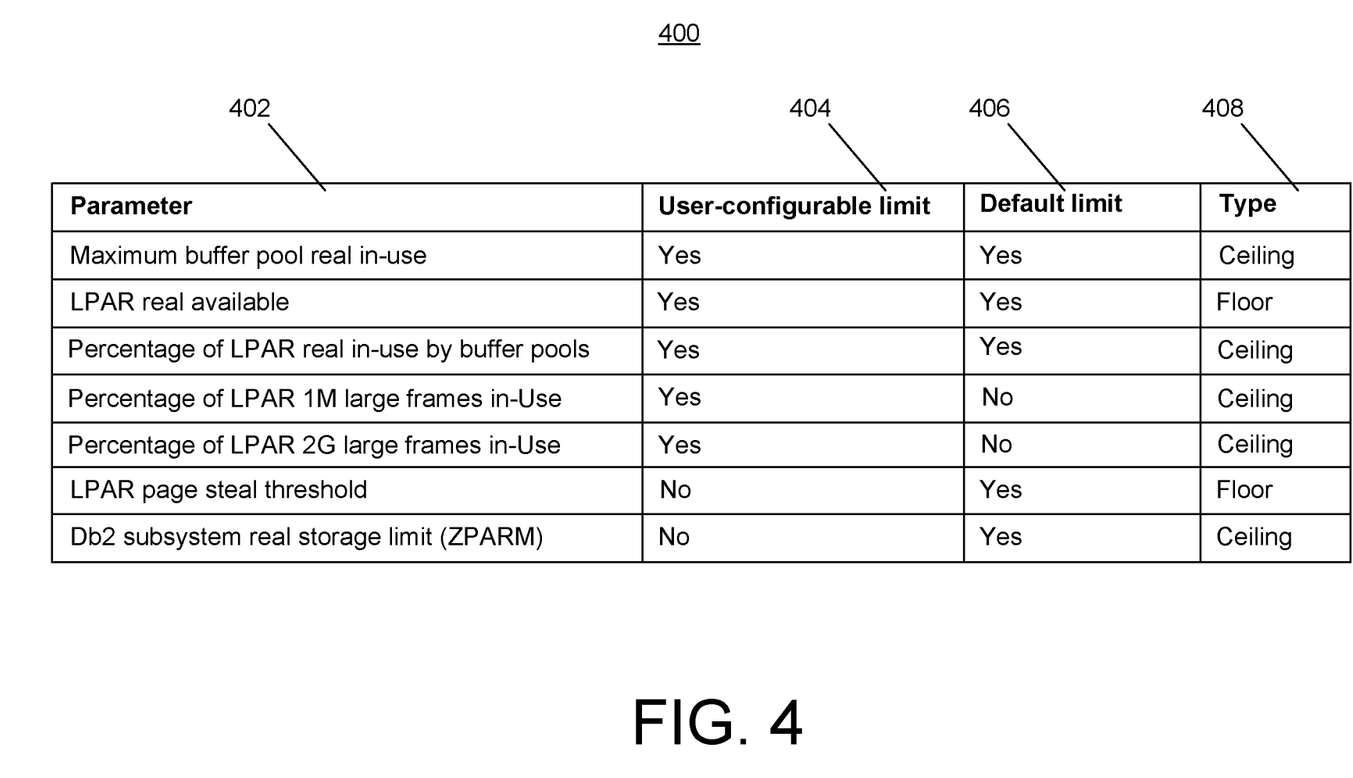
FIG. 4 is an example table of LPAR parameters.

FIG. 4 illustrates an example table 400 of LPAR parameters. Table 400 includes columns for a parameter 402, a user-configurable limit 404, a default limit 406, and a type 408. Table 400 lists the parameters 402 that are monitored by the data collector 260. One or more of the parameters 402 may be user-configurable limit 404. One or more of the parameters may include a default limit 406 and a type 408, where the type may be a ceiling type or a floor type. In some implementations, the parameters 402 may include the maximum buffer pool real in-use, the LPAR real available, the percentage of LPAR real in-use by the buffer pools, the percentage of LPAR 1M large frames in-use, the percentage of LPAR 2G large frames in-use, the LPAR page steal threshold, and the Db2 subsystem real storage limit (ZPARM).

The maximum buffer pool real in-use refers to the amount of real storage in-use on the LPAR. This parameter is the user-configurable limit and also may include the default limit, if no user-configurable limit is received. This parameter is a ceiling type parameter. The LPAR real available refers to the amount of real storage available on the LPAR. The percentage of LPAR real in-use by buffer pools refers to the percentage of real storage of the LPAR in-use by the buffer pools. The Db2 subsystem real storage limit (ZPARM) refers to the amount of real storage that each Db2 subsystem (e.g., database subsystem) that the LPAR may use. As noted above, the LPAR 100 may include multiple database subsystems 110, 120, 130, and 140 that share the real storage available on the LPAR 100. The data collector 260 may calculate default floor values and default ceiling values as safeguards in the absence of user-configurable limits.

The table 400 of parameters 402 may be used as boundaries to determine whether or not to page fix one or more of the buffer pools 212. If any of the boundaries are in a warning state or an alert state, then the data collector 260 does not recommend performing a page fix for the identified buffer pools. The data collector 260 may start with the buffer pool having the highest cumulative I/O intensity score and determine if there is real storage available and if the parameters are in a normal state. If the criteria are met, then the buffer pool is page-fixed. If there is not enough real storage or one or more of the parameters are in the warning state or the alert state (i.e., not in the normal state), then the buffer pool is not page fixed and the data collector 260 moves on to check the next identified buffer pool on the list having the next highest cumulative I/O intensity score.

In some implementations, the data collector 260 may receive a query (e.g., a first query function) for an analysis of a specific buffer pool from the buffer pools 212. The data collector 260 processes the first query function to provide real-time analysis for the specific buffer pool, including the current daily buffer pool ranking in for example, the database subsystem 110. The first query function may include a command entered into the system to trigger a listing of a ranking for the specific buffer pool. The result of the first query function may provide the cumulative I/O intensity for the buffer pool and the ranking of the buffer pool compared to other buffer pools 212 during the current periodic interval. The result of the first query function also may output for display the buffer pool having the highest ranking based on the cumulative I/O intensity.

In some implementations, the data collector 260 may receive another query (e.g., a second query function). The second query function provides a function that produces a daily top list of best buffer pool candidates for page fixing in each monitored database subsystem 110, 120, 130, and 140. The second query function may include a command entered into the system to trigger a daily top list of the best buffer pool candidates for page fixing.

The data collector 260 may perform process 300 over multiple cycles and gradually page fix buffer pools 212 over time. Page fixing of buffer pools may be performed over a long period of time (e.g., many cycles). With real storage being a critical resource on the LPAR 100, taking a staged approach to the allocation of this resource reduces the likelihood that page-fix activities will later have to be revisited due to adverse effects on overall system performance.

Figure 5:
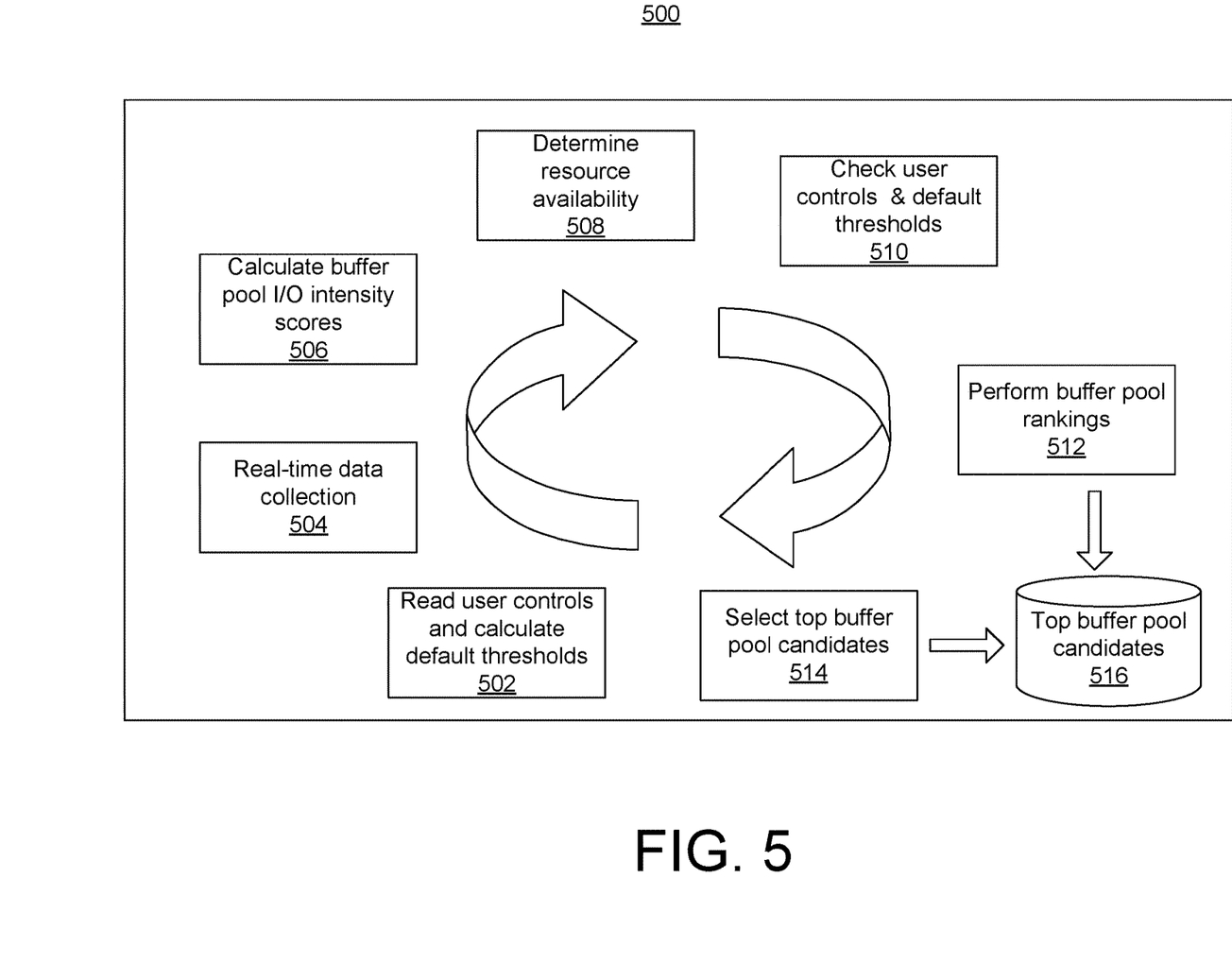
FIG. 5 is an example flow diagram of a process performed at periodic intervals on each database subsystem for identifying buffer pool candidates for page fixing using the data collector from FIG. 2.

FIG. 5 illustrates an example flow diagram of process 500 performed at periodic intervals on each database subsystem 110, 120, 130, and 140 for identifying buffer pool candidates for page fixing using the respective data collector on each database subsystem 110, 120, 130, and 140. For instance, the data collector 260 from FIG. 2 may perform the process 500 for the database subsystem 110.

Process 500 illustrates that the process steps performed by the data collector 260 are occurring during periodic intervals (e.g., every five minutes). The information collected and processed during the periodic interval may be saved and accumulated for use when identifying a buffer pool for page fixing across the LPAR 100.

Process 500 includes reading user controls (e.g., also referred to as user-configurable thresholds) and calculating default thresholds 502 when user controls are not provided. Process 500 includes real-time data collection (504) and calculating buffer pool I/O intensity scores (506). Process 500 determines resource availability (508) such as the real storage availability on the LPAR. Process 500 checks the user controls and default thresholds (510). Process 500 performs buffer pool rankings (512) for the buffer pools 212 in the database subsystem 110. Process 500 selects the top buffer pool candidates (514) based on the calculated I/O intensity scores. Process 500 then stores the top buffer pools candidates 516 for the database subsystem 110.

Figure 6:
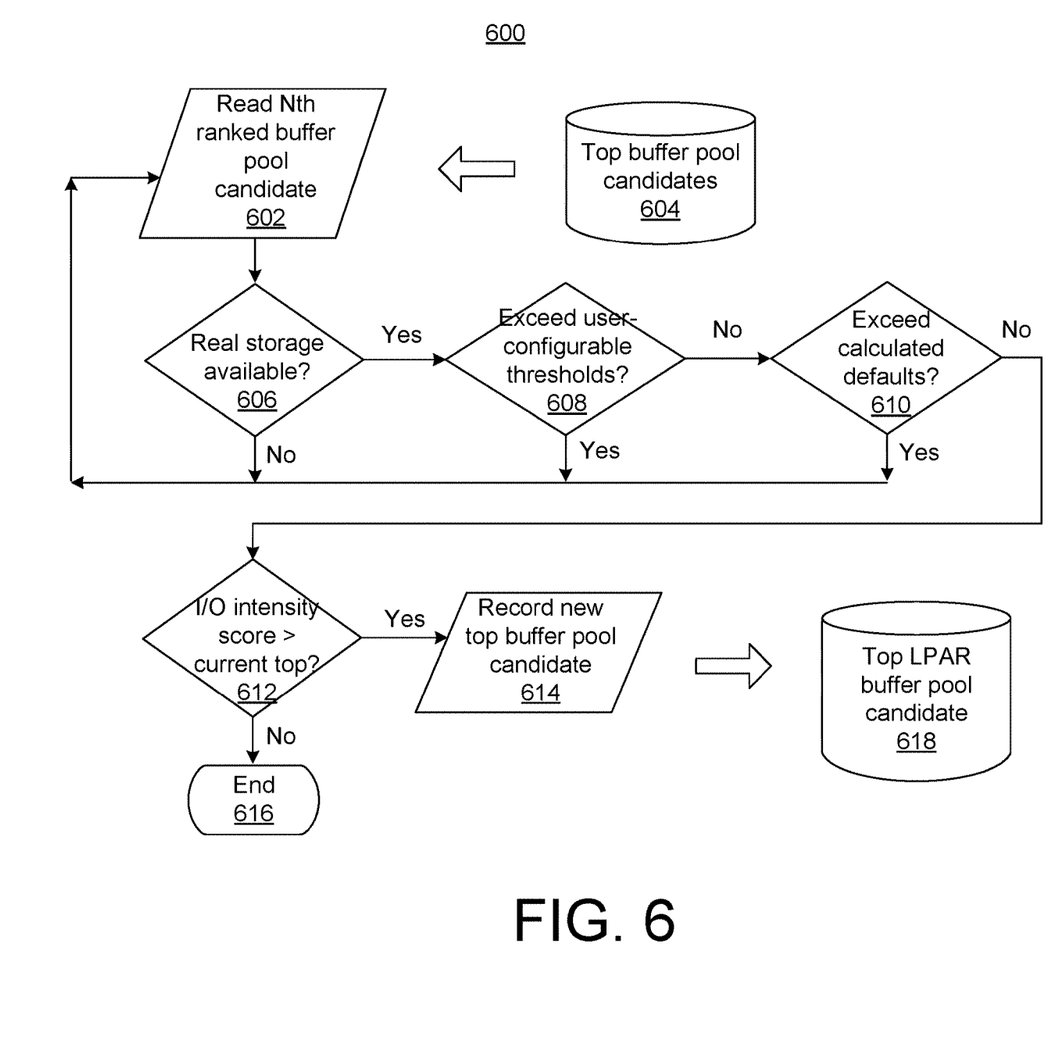
FIG. 6 is an example flow diagram of a process performed each cycle of multiple periodic intervals for identifying a buffer pool candidate for page fixing using the data collector from FIG. 2.

FIG. 6 is an example flow diagram of a process 600 performed each cycle of multiple periodic intervals for identifying a buffer pool candidate for page fixing using the data collector 260 from FIG. 2. Process 600 reads the highest-ranked buffer pool candidate (602) from the storage of the top buffer pool candidates (604) out of all the database subsystems on the LPAR. Process 600 determines if real storage is available (606) for the highest-ranked buffer pool candidate that was read (606). If no, then process 600 reads the next highest-ranked buffer pool candidate (602). If yes, then process 600 determines if the user-configurable thresholds are exceeded (608). If yes, then process 600 reads the next highest-ranked buffer pool candidate (602). If no, then process 600 determines if the calculated defaults are exceeded (610). If yes, then process 600 reads the next highest-ranked buffer pool candidate (602). If no, then process 600 determines if the cumulative I/O intensity score is greater than the cumulative I/O intensity score of the current top buffer pool candidate for page fixing (612). If no, then process 600 ends (616).

If yes, the process 600 records the new top buffer pool candidate (614) in the storage for the top LPAR buffer pool candidate (618). The data collector 260 then may automatically page-fix the new top buffer pool candidate. In some implementations, the data collector 260 may simply store the new top buffer pool candidate in the storage for the top LPAR buffer pool candidate (618) and wait until a next cycle to determine if there is another buffer pool that has a higher cumulative I/O intensity score than the stored top buffer pool candidate. If there is and that buffer pool meets the real storage and other threshold criteria, then the stored top buffer pool candidate is replaced.

FIG. 7 is an example screen shot 700 of an output identifying a top buffer pool candidate for page fixing. The screen shot 700 identifies the buffer pool as buffer pool BPO (702). The screen shot 700 also identifies the cumulative I/O intensity score (704) of 2880 and the ranking of 1 (706). Screen shot 700 also displays a recommended frame size of 1M (708) and number of frames 8 needed for page fixing (710). Screen shot 700 also displays whether or not the resources are available for page fixing in this example screen shot denoting with "Y" (712). Finally, screen shot 700 displays both a "Before" page-fixing analysis and an "After" page-fixing assessment (714) analysing buffer pools real in use, Db2 real in use, LPAR real available, Percent of LPAR DB2 used, LPAR 1M uses, and LPAR 2G in used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for identifying a buffer pool for page fixing, the method comprising:
for each database subsystem in a plurality of database subsystems running in a logical partition (LPAR):
collecting data from a plurality of buffer pools on a periodic interval;
monitoring real storage availability on the LPAR;
calculating an input/output (I/O) intensity score for each buffer pool from the plurality of buffer pools for the periodic interval;
ranking the plurality of buffer pools based on the I/O intensity score;
calculating a cumulative I/O intensity score for each buffer pool from the plurality of buffer pools across a cycle of multiple periodic intervals;
ranking the plurality of buffer pools based on the cumulative I/O intensity score;
selecting a buffer pool candidate for page fixing, wherein the buffer pool candidate for page fixing is a highest-ranked buffer pool from the plurality of buffer pools during the cycle based on the cumulative I/O intensity score that satisfies the real storage availability on the LPAR; and
page fixing the buffer pool candidate selected for page fixing.

2. The computer-implemented method as in claim 1, wherein calculating the cumulative I/O intensity score for each buffer pool from the plurality of buffer pools is based on a number of times the buffer pool was ranked in multiple different top rankings based on the I/O intensity score.

3. The computer-implemented method as in claim 1, further comprising:
monitoring an availability of frame sizes on the LPAR;
selecting an optimal frame size based on the availability of frame sizes on the LPAR; and
page fixing the buffer pool candidate selected for page fixing using the optimal frame size.

4. The computer-implemented method as in claim 1, further comprising:
receiving user-configurable thresholds for LPAR parameters; and
calculating default thresholds for the LPAR parameters when the user-configurable thresholds are not received, wherein the buffer pool candidate for page fixing is the highest-ranked buffer pool from the plurality of buffer pools during the cycle based on the cumulative I/O intensity score that satisfies the real storage availability on the LPAR, the user-configurable thresholds for the LPAR parameters, and the default thresholds for the LPAR parameters.

5. The computer-implemented method as in claim 1, further comprising:
receiving a query for an analysis of a specific buffer pool from the plurality of buffer pools; and
in response to the query, outputting a ranking and an I/O intensity score for the specific buffer pool, wherein the ranking is based on the I/O intensity score for the specific buffer pool.

6. The computer-implemented method as in claim 1, further comprising:
receiving a query for a ranking of top candidates for page fixing from a specific database subsystem; and
in response to the query, outputting the ranking of the top candidates for page fixing from the specific database subsystem.

7. A computer program product for identifying a buffer pool for page fixing, the computer program product being tangibly embodied on a non-transitory computer-readable medium and including executable code that, when executed, causes a computing device, for each database subsystem in a plurality of database subsystems running in a logical partition (LPAR), to:
collect data from a plurality of buffer pools on a periodic interval;
monitor real storage availability on the LPAR;
calculate an input/output (I/O) intensity score for each buffer pool from the plurality of buffer pools for the periodic interval;
rank the plurality of buffer pools based on the I/O intensity score;
calculate a cumulative I/O intensity score for each buffer pool from the plurality of buffer pools across a cycle of multiple periodic intervals;
rank the plurality of buffer pools based on the cumulative I/O intensity score;
select a buffer pool candidate for page fixing, wherein the buffer pool candidate for page fixing is a highest-ranked buffer pool from the plurality of buffer pools during the cycle based on the cumulative I/O intensity score that satisfies the real storage availability on the LPAR; and
page fix the buffer pool candidate selected for page fixing.

8. The computer program product of claim 7, wherein calculating the cumulative I/O intensity score for each buffer pool from the plurality of buffer pools is based on a number of times the buffer pool was ranked in multiple different top rankings based on the I/O intensity score.

9. The computer program product of claim 7, further comprising executable code that, when executed, causes the computing device to:
monitor an availability of frame sizes on the LPAR;
select an optimal frame size based on the availability of frame sizes on the LPAR; and
page fix the buffer pool candidate selected for page fixing using the optimal frame size.

10. The computer program product of claim 7, further comprising executable code that, when executed, causes the computing device to:
receive user-configurable thresholds for LPAR parameters; and calculate default thresholds for the LPAR parameters when the user-configurable thresholds are not received, wherein the buffer pool candidate for page fixing is the highest-ranked buffer pool from the plurality of buffer pools during the cycle based on the cumulative I/O intensity score that satisfies the real storage availability on the LPAR, the user-configurable thresholds for the LPAR parameters, and the default thresholds for the LPAR parameters.

11. The computer program product of claim 7, further comprising executable code that, when executed, causes the computing device to:
   receive a query for an analysis of a specific buffer pool from the plurality of buffer pools; and
   in response to the query, output a ranking and an I/O intensity score for the specific buffer pool, wherein the ranking is based on the I/O intensity score for the specific buffer pool.

12. The computer program product of claim 7, further comprising executable code that, when executed, causes the computing device to:
   receive a query for a ranking of top candidates for page fixing from a specific database subsystem; and
   in response to the query, output the ranking of the top candidates for page fixing from the specific database subsystem.

13. A system for identifying a buffer pool for page fixing, the system comprising:
   at least one processor; and
   a non-transitory computer-readable medium comprising instructions that, when executed by the at least one processor, cause the system to:
      for each database subsystem in a plurality of database subsystems running in a logical partition (LPAR):
         collect data from a plurality of buffer pools on a periodic interval;
         monitor real storage availability on the LPAR;
         calculate an input/output (I/O) intensity score for each buffer pool from the plurality of buffer pools for the periodic interval;
         rank the plurality of buffer pools based on the I/O intensity score;
         calculate a cumulative I/O intensity score for each buffer pool from the plurality of buffer pools across a cycle of multiple periodic intervals;
         rank the plurality of buffer pools based on the cumulative I/O intensity score;
         select a buffer pool candidate for page fixing, wherein the buffer pool candidate for page fixing is a highest-ranked buffer pool from the plurality of buffer pools during the cycle based on the cumulative I/O intensity score that satisfies the real storage availability on the LPAR; and
         page fix the buffer pool candidate selected for page fixing.

14. The system of claim 13, wherein calculating the cumulative I/O intensity score for each buffer pool from the plurality of buffer pools is based on a number of times the buffer pool was ranked in multiple different top rankings based on the I/O intensity score.

15. The system of claim 13, further comprising instructions that, when executed by the at least one processor, cause the system to:
   monitor an availability of frame sizes on the LPAR;
   select an optimal frame size based on the availability of frame sizes on the LPAR; and
   page fix the buffer pool candidate selected for page fixing using the optimal frame size.

16. The system of claim 13, further comprising instructions that, when executed by the at least one processor, cause the system to:
   receive user-configurable thresholds for LPAR parameters; and
   calculate default thresholds for the LPAR parameters when the user-configurable thresholds are not received, wherein the buffer pool candidate for page fixing is the highest-ranked buffer pool from the plurality of buffer pools during the cycle based on the cumulative I/O intensity score that satisfies the real storage availability on the LPAR, the user-configurable thresholds for the LPAR parameters, and the default thresholds for the LPAR parameters.

17. The system of claim 13, further comprising instructions that, when executed by the at least one processor, cause the system to:
   receive a query for an analysis of a specific buffer pool from the plurality of buffer pools; and
   in response to the query, output a ranking and an I/O intensity score for the specific buffer pool, wherein the ranking is based on the I/O intensity score for the specific buffer pool.

18. The system of claim 13, further comprising instructions that, when executed by the at least one processor, cause the system to:
   receive a query for a ranking of top candidates for page fixing from a specific database subsystem; and
   in response to the query, output the ranking of the top candidates for page fixing from the specific database subsystem.

* * * * *